J. V. ROBINSON.
AUTOMATIC TRAIN PIPE COUPLING.
APPLICATION FILED JUNE 13, 1913.
1,245,782.
Patented Nov. 6, 1917.
2 SHEETS—SHEET 1.
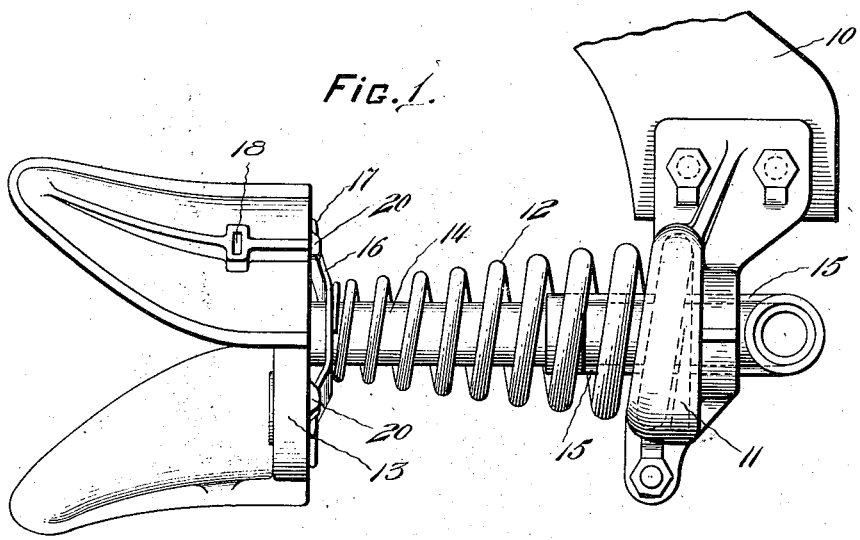
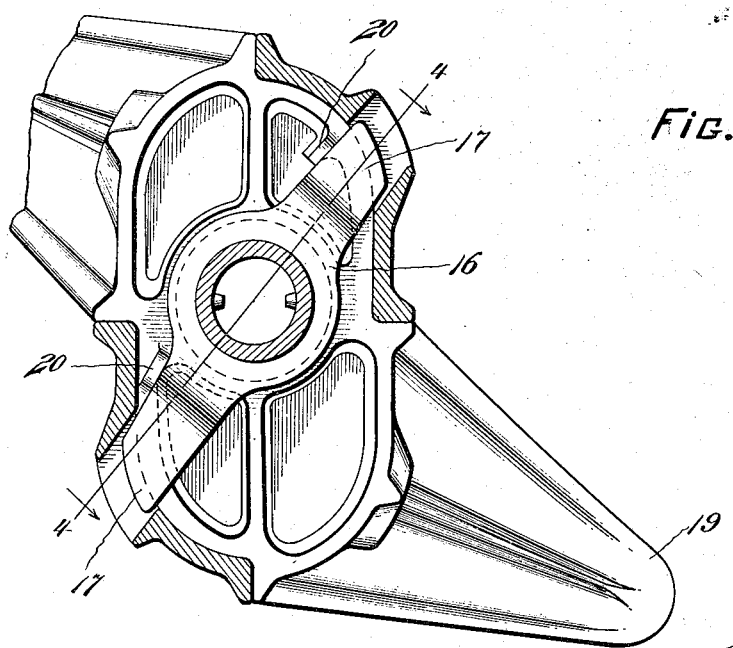
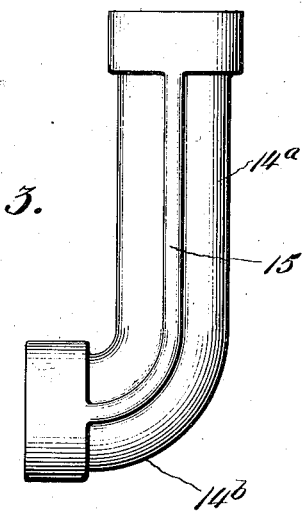

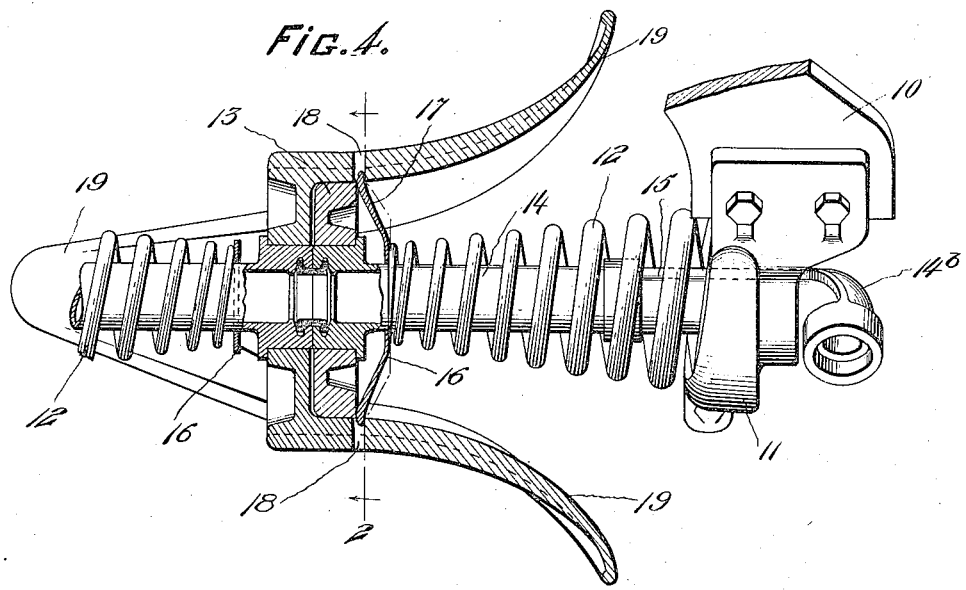
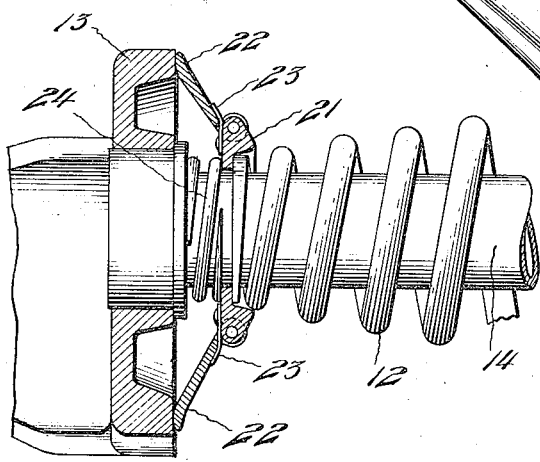
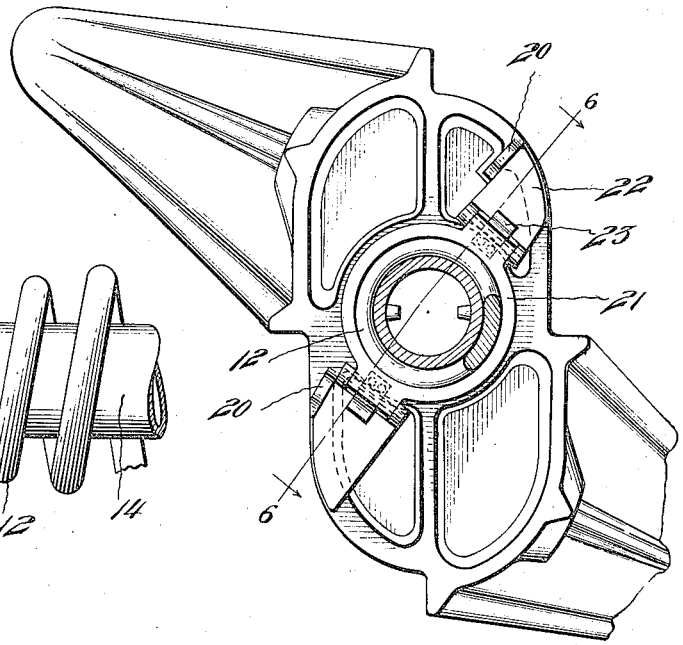

UNITED STATES PATENT OFFICE.

JOSEPH V. ROBINSON, OF CHEVY CHASE, MARYLAND.

AUTOMATIC TRAIN-PIPE COUPLING.

1,245,782. Specification of Letters Patent. Patented Nov. 6, 1917.

Application filed June 13, 1913. Serial No. 773,559.

*To all whom it may concern:*

Be it known that I, JOSEPH V. ROBINSON, a citizen of the United States, residing at Chevy Chase, Maryland, have invented certain new and useful Improvements in Automatic Train-Pipe Couplings, of which the following is a specification.

The objects of the present invention are to provide an automatic train pipe coupling with means for securely locking the meeting faces of the coupling members together, whereby a tight joint between the ports of the coupling members is secured; to provide a locking device which will operate automatically for the purpose stated when the coupling members are brought forcibly together and which will release automatically when the coupling members are separated; and to so construct the locking device that it will take up wear between the coupling faces and continue to secure them together after considerable use. Other objects of the invention will appear from the following detailed specification taken in connection with the accompanying drawing, in which, Figure 1 is a side elevation of one coupling member complete;

Fig. 2 is a section on the line 2—2 of Fig. 4;

Fig. 3 is a view of that part of the coupling which connects with the train pipe;

Fig. 4 is a section on the line 4—4 of Fig. 2;

Fig. 5 is a view similar to Fig. 2 but showing a modification of the locking device; and Fig. 6 is a section on the line 6—6 of Fig. 5.

Referring to Figs. 1 to 4 of the drawing, 10 indicates a bracket extending downward from the drawhead or other permanent part of a railway car and 11 indicates a train pipe coupler base rigidly attached to the bracket by suitable means. The end coil or coils of a spring 12 are rigidly connected to the base 11 and the spring extends forwardly and flexibly sustains the coupler head 13. The spring is preferably tapered, as shown, and coiled from a tapered rod, the smaller coils of the spring being thus of less cross section than the larger coils. The head 13 is secured on the end of a tube or pipe 14 which extends rearwardly through the spring 12 and freely through a central opening in the base 11. The tube 14 is preferably made in two parts, the rear portion $14^a$ carrying the ribs 15, as shown in Figs. 1 and 3, and having a right angled bend $14^b$ for attachment to the usual train pipe. The tube sections 14, $14^a$ are connected by a threaded joint and the section $14^a$ is preferably formed at its rear end with ribs 15 which intermesh loosely with notches or projections in the base 11 to prevent the coupling member from turning on its axis while permitting it to move freely rearward and to a limited extent laterally and vertically. In the drawing I have shown a single port in the coupling head and a single tube extending rearwardly therefrom. In this construction the tube is intended for the brake air pipe, but additional ports for the signal air and heating steam may be supplied without departing from the present invention. The coupling as above described excepting the tube 14, 15, forms the subject-matter of applications heretofore filed and is not claimed herein. I shall now proceed to describe my improvements constituting the present invention.

In Figs. 1, 2 and 4, 16 indicates a spring device having two locking tongues 17. The device 16 has a central opening through which the tube 14 passes, the device being free to slide on the tube. The tongues 17 are bent forwardly and then outwardly as shown particularly in Fig. 4 and they normally rest on the back of the coupling head with their outer ends flush with the margin thereof. They are held in this position, normally, by the pressure of the spring 12, the smaller end of which rests on the locking device, as shown in Figs. 1 and 4.

When two coupling heads are brought together, the springs 12 are compressed to a considerable degree and exert pressure upon the locking devices 16, tending to straighten them and forcing the tongues 17 radially outward. Slots or openings 18 in the guides of the opposing coupling member are so located that the tongues 17 move into them when two coupling members come together with sufficient force to cause the locking devices 16 to yield. The outer ends of the tongues are so formed that they tend to cam or pry the coupling heads together with considerable force and thus hold the bushings of the mating ports in the coupling heads securely together. A further result of this action is that no relative movement between coupling heads is permitted and wear is therefore largely prevented. The position of the tongues 17 when two coupling members are locked is shown in Figs. 2 and 4.

As shown the openings 18 for the locking tongues are in the coupler guide wings 19 but these openings may be otherwise located if different forms of guides are used. The inner sides of the openings in each coupler head are at a less distance from the coupler face than the thickness of the opposing coupler head, which permits the tongues to hold the coupler members tightly together even after the faces of the couplings become somewhat worn. When cars are uncoupled the springs 12 first expand as the pressure between the coupling members is relieved and each spring locking device 16 then resumes its normal bowed condition, withdrawing the locking tongues 17 from the openings 18. The locking device is prevented from turning on the pipe 14 by means of stops 20 on the back of the coupling head. It will be understood that each of the two members constituting a complete coupling is furnished with the locking device 16 and with openings 18 to coöperate with the locking device of the mating member.

In Figs. 5 and 6, there is shown another form of locking device which comprises a ring 21 encircling the tube or pipe 14 and two locking tongues 22 hinged to the ring at opposite sides thereof. Springs 23 press the tongues forward and give to this device the bowed form of the locking device shown in Figs. 1 to 4. The smaller end of the spring 12 is seated in the back of the ring 21 and a lighter spring 24 is arranged between the ring 21 and the back of the coupler head 13. The spring 24 holds the locking device normally in the position shown in Figs. 5 and 6. When two coupling members are brought together the pressure of each on the other causes the spring 24 to yield and the ring 21 moves toward the coupler head 13, forcing the locking tongues 22 radially outward into openings 18, similar to those shown in Figs. 1 and 4, thus locking the coupling heads together as previously described. As the heads separate in uncoupling, the spring 24 expands and withdraws the locking tongues 22. The operation of the locking device shown in Figs. 5 and 6 is substantially the same as that of the device shown in the remaining figures of the drawings.

Having thus described my invention, what I claim and desire to secure by Letters Patent is:

1. In an automatic train pipe coupling, the combination of two mating coupling members, each comprising a head having guides thereon, a tube extending rearward from the head, a coiled spring surrounding the tube and adapted to be compressed as the two coupling members come into engagement, and a plurality of locking tongues supported on and extending radially from the tube, between the head thereon and the supporting spring, and adapted to be projected into engagement with the other coupling member when the supporting spring is compressed as the coupling members come into coupling relation.

2. In an automatic train pipe coupling, the combination with two mating coupling members each having a head and guides thereon, a bracket in rear of each head, a sectional tube connected with each head and extending rearwardly through the adjacent bracket, the rear section of said tube having longitudinally extending ribs 15 engaging the bracket to prevent rotation of the coupling head, a spring surrounding the tube between each bracket and the adjacent coupling head, and a locking device carried by each member and adapted to engage the other member of the coupling when said members are brought together in service.

3. In an automatic train pipe coupling, the combination with two mating coupling members each having a head and guides thereon, of a locking device at the back of the head and being bowed away from said head, the said device having spring tongues adapted to move radially outward, and the opposing member having openings to receive said tongues.

4. In an automatic train pipe coupling, the combination with two mating coupling members each having a head and guides thereon, of tubes extending rearward from the heads, a locking device arranged at the back of a head of one of the members and having an opening through which the tube passes, and said devices having tongues adapted to move radially outward when the coupling members are brought together, under pressure, and means on the opposing coupling member with which said tongues coöperate to lock the heads of the coupling members securely together.

5. In an automatic train pipe coupling, the combination with two mating coupling members each having a head and guides thereon, of tubes supporting the heads, coiled springs supporting the ends of the tubes to which the heads are connected, a normally bowed spring locking device at the back of one of the heads and having an opening through which the tube passes, spring tongues on said locking device, and means on the opposing head with which said tongues interlock when the coupling members are brought together in service, the spiral supporting spring being arranged to bear directly upon the locking device.

6. In an automatic train pipe coupling, the combination with two mating coupling members each having a head and guides thereon, of a locking device carried by one member in the rear of the head thereof and comprising bowed tongues extending radially outward and openings in the guides of the opposing member arranged to receive said tongues when the coupling members are brought together in service whereby the heads of the opposing members are securely locked together.

7. In an automatic train pipe coupling, the combination with two mating coupling members each having a head and guides thereon, of tubular members extending rearward from the heads, spiral supporting springs surrounding the said members, a locking device on each member arranged intermediate the spiral supporting spring and back of the head, said locking device being normally and resiliently held in bowed form and being provided with tongues which move radially outward when pressure is brought to bear on the devices, the said spiral supporting springs being arranged to act upon said locking devices to operate the same.

8. In an automatic train pipe coupling, a coupling member comprising a tubular support, a head thereon provided with guides, a locking device arranged at the back of the head, a spiral spring surrounding the tubular support and bearing upon said locking device, and means for rigidly supporting the inner end of the spiral spring, said locking device being adapted to be operated by pressure on said spiral spring, and to be released when the pressure of the spiral spring is withdrawn.

In testimony whereof I affix my signature in presence of two witnesses.

JOSEPH V. ROBINSON.

Witnesses:
 EARLE A. BARKER,
 J. A. WATSON.